United States Patent
Richman et al.

(10) Patent No.: US 6,982,999 B1
(45) Date of Patent: Jan. 3, 2006

(54) MULTIPASS SECOND HARMONIC GENERATION

(75) Inventors: Bruce Richman, Sunnyvale, CA (US); Chris W. Rella, Sunnyvale, CA (US); Konstantin Vodopyanov, San Jose, CA (US)

(73) Assignee: Picarro, Inc., Sunnyvale, CA (US)

(*) Notice: Subject to any disclaimer, the term of this patent is extended or adjusted under 35 U.S.C. 154(b) by 18 days.

(21) Appl. No.: 10/349,379

(22) Filed: Jan. 21, 2003

(51) Int. Cl.
*H01S 3/10* (2006.01)
(52) U.S. Cl. .................................. 372/22; 359/328
(58) Field of Classification Search .............. 372/22, 372/108, 98; 359/326, 328; 356/480
See application file for complete search history.

(56) References Cited

U.S. PATENT DOCUMENTS

| | | | |
|---|---|---|---|
| 3,950,103 A * | 4/1976 | Schmidt-Weinmar | 356/450 |
| 5,289,491 A | 2/1994 | Dixon | |
| 5,321,718 A * | 6/1994 | Waarts et al. | 372/108 |
| 5,450,429 A * | 9/1995 | Klemer et al. | 372/22 |
| 5,648,866 A * | 7/1997 | Trebino et al. | 359/326 |

OTHER PUBLICATIONS

Jnl. Appl. Phys. vol. 39, No. 8, p. 3597-3609 Jul. 1968.

* cited by examiner

*Primary Examiner*—Minsun Oh Harvey
*Assistant Examiner*—James Menefee
(74) *Attorney, Agent, or Firm*—Lumen Intellectual Property Services, Inc.

(57) ABSTRACT

According to an embodiment of the invention, improved multipass second harmonic generation (SHG) is provided by the use of an inverting, self-imaging telescope. This embodiment ensures parallelism of all passes of all beams within the nonlinear medium. According to another embodiment of the invention, improved multipass SHG is provided by the use of a wedged phasor. This arrangement provides a simple adjustment of the relative phase of the pump beam and second harmonic beam between passes. According to a further embodiment of the invention, improved multipass SHG is provided by the use of an inverting self-imaging telescope in combination with a wedged phasor. This arrangement provides a simple adjustment of the relative phase of the pump beam and second harmonic beam between passes, and ensures parallelism of all passes of all beams within the nonlinear medium. This arrangement also allows corresponding passes of the pump beam and second harmonic beam to be made collinear within the nonlinear medium by design.

24 Claims, 2 Drawing Sheets

MULTIPASS SECOND HARMONIC GENERATION

FIELD OF THE INVENTION

This invention relates to nonlinear optics, and more specifically to multipass second harmonic generation.

BACKGROUND OF THE INVENTION

Second harmonic generation (SHG) is a nonlinear optical process where an optical beam, called the pump beam, interacts with an optically nonlinear medium to generate a second harmonic beam, where the frequency of the second harmonic beam is twice the frequency of the pump beam. Equivalently, the free space wavelength of the second harmonic is half the free space wavelength of the pump. The pump beam can interact with the optically nonlinear medium by passing through the medium and/or by being reflected from the medium. Any material which lacks inversion symmetry can be used as the optically nonlinear medium for SHG. Materials which are commonly used for SHG include $LiNbO_3$ and $KTiOPO_4$ (KTP). For SHG, the nonlinearity of a material is expressed in terms of a second order nonlinear susceptibility tensor $\chi^{(2)}$.

Second harmonic generation (especially using a continuous-wave pump) tends to be an inefficient process, where efficiency is the ratio of power emitted in the second harmonic beam divided by the power of the pump beam. The main reason for this inefficiency is that the nonlinearities provided by optically nonlinear materials tend to be weak. Therefore, various measures to improve SHG efficiency have been developed. One way to increase efficiency is to provide more power in the pump beam, because the second harmonic beam power is proportional to the square of the pump beam power in the low efficiency limit (i.e., $P_{2\omega} \ll P_\omega$, where $P_{2\omega}$ and $P_\omega$ are the second harmonic power and pump power respectively). However, the available pump beam power is usually limited, so methods of increasing SHG efficiency for a fixed pump power are of greater interest.

Ensuring phase-matching between the pump beam and the second harmonic beam is the most important of these methods. Phase-matching is collinear if the pump and second harmonic wave vectors are parallel, and non-collinear if the pump and second harmonic wave vectors are not parallel. Non-collinear phase-matching typically leads to the generation of a second harmonic beam which is not parallel to the pump beam. Collinear phase-matching is more commonly employed in practice than non-collinear phase-matching. Assume a pump beam illuminates a section of an optically nonlinear medium. If the phase-matching condition is not satisfied, second harmonic radiation emitted from various points along the illuminated section will interfere destructively, and as a result, the second harmonic beam power will be a periodic function of position, with period $2L_c$, along the illuminated section. As taught in U.S. Pat. No. 3,407,309 to R. C. Miller, the coherence length $L_c$ is given by $L_c = \lambda/4\Delta n$, where $\lambda$ is the free space wavelength of the pump, $\Delta n = |n_\omega - n_{2\omega}|$, $n_\omega$ is the refractive index of the nonlinear medium at the pump wavelength and $n_{2\omega}$ is the refractive index of the nonlinear medium at the second harmonic wavelength. If the phase-matching condition is exactly satisfied, i.e., $n_\omega = n_{2\omega}$, there will be no destructive interference, and as a result, the second harmonic beam power will increase monotonically along the illuminated section. In a nonlinear device of length L, phase-matching is sufficiently well achieved if $L_c$ is comparable to, or larger than, L. Since L is typically on the order of 1 cm, and $\lambda$ is typically on the order of 1 $\mu$m, $\Delta n$ must be smaller than about 0.00003 to achieve phase-matching in a typical nonlinear optical device.

Because $\Delta n$ is typically much larger than 0.00003, due to the dependence of refractive index on wavelength (i.e., dispersion), special methods must be employed to satisfy the phase-matching condition. Two of these methods are birefringent phase-matching (BPM) and quasi-phase-matching (QPM). In a birefringent material, the index of refraction experienced by an optical beam depends on the polarization of the beam. For example, the two states of polarization are called "ordinary" and "extraordinary", with corresponding indices $n_o$ and $n_e$, in a uniaxial birefringent medium. BPM is accomplished by selecting a birefringent material which emits second harmonic radiation that is orthogonally polarized to the pump radiation (which imposes certain requirements on the elements of $\chi^{(2)}$) and by ensuring $n_{o\omega} \approx n_{e2\omega}$ (or $n_{e\omega} \approx n_{p2\omega}$). In other words, the difference in index due to dispersion is compensated by the difference in index due to polarization, because the pump and second harmonic beams have different states of polarization.

Birefringent phase-matching is not always possible. For example, a nonlinear material which is not birefringent cannot be birefringently phase-matched. Even for birefringent materials, it is frequently desirable for the polarization of the pump and second harmonic beams to be the same (e.g., to make use of a larger element of the $\chi^{(2)}$ tensor, or to avoid the beam walk-off frequently associated with BPM). In these cases, QPM can be employed. As indicated above, in a non-phase-matched interaction, the second harmonic power varies periodically along an illuminated section of nonlinear material with period $2L_c$. Let z be position along the illuminated section. The second harmonic power increases to a maximum in the range $0 < z < L_c$ and decreases back to zero in the range $L_c < z < 2L_c$, and this behavior repeats periodically. Thus the contribution of the second coherence length of material to the second harmonic beam exactly cancels the contribution of the first coherence length of material to the second harmonic beam, and the fourth coherence length cancels the third coherence length etc. Basically, the even coherence lengths cancel the odd coherence lengths.

The purpose of QPM is to disrupt this cancellation by periodically altering the properties of a nonlinear material so that each section of length $2L_c$ makes a net contribution to the second harmonic beam power. This can be accomplished in various ways. One method is to eliminate the nonlinearity of every even coherence length (e.g., by selectively disordering the material to set $\chi^{(2)}$ equal to zero). In this case, the even coherence lengths make no contribution to the second harmonic beam, and the above cancellation is eliminated. Another method is to periodically change the sign of $\chi_{(2)}$ so that $\chi^{(2)}$ in all the even coherence lengths is equal and opposite to $\chi^{(2)}$ in all the odd coherence lengths. This periodic alteration of $\chi^{(2)}$ can be accomplished by electrical and/or chemical poling of a ferroelectric or other suitable material (e.g., periodic poling of $KTiOPO_4$), or by epitaxial regrowth techniques for semiconductors (e.g., GaAs). The sign change of $\chi^{(2)}$ for the even coherence lengths turns destructive interference into constructive interference. In other words, the second harmonic emitted by the even coherence lengths adds constructively to the second harmonic emitted by the odd coherence lengths. Since all parts of the device contribute constructively to the emitted second harmonic when the sign of $\chi^{(2)}$ is periodically changed, this form of QPM is preferable to QPM obtained by periodically setting $\chi^{(2)}$ to zero.

The above (first order) QPM methods require periodic modification of the properties of a nonlinear material with period $2L_c$. Since $L_c$ is typically small (e.g., $\Delta n= 0.01$ gives $L_c$=25 $\mu$m for $\lambda$=1 $\mu$m), advanced material fabrication and/or processing technology is typically required for QPM. QPM can also be accomplished by periodically modifying material properties with a longer period (e.g., a period of $6L_c$ for third order QPM, a period of $10L_c$ for fifth order QPM etc.), but these higher order QPM methods are less efficient than first order QPM. The purpose of higher order QPM is to disrupt the cancellation of an "odd" section of length $nL_c$ by the following "even" section of length $nL_c$, by altering the material properties of each "even" section so that each section of length $2nL_c$ makes a net contribution to the second harmonic beam power. In higher order QPM, n must be odd, so that a section of length $nL_c$ makes a nonzero contribution to the second harmonic beam power.

The pump beam for SHG frequently propagates through a nonlinear medium as a Gaussian beam which is brought to a focus (i.e., has a beam waist) inside the nonlinear medium. Phase-matched SHG efficiency increases as the pump intensity and interaction length increase, so it is desirable to maximize both of these parameters. However, increasing the intensity of a beam by bringing it to a smaller focused spot increases beam divergence, which effectively reduces the interaction length. Therefore, there is an optimal waist 1/e amplitude radius w for the pump that maximizes the efficiency of phase-matched SHG in a nonlinear medium of length L. The optimal relation (assuming no beam walkoff between pump and second harmonic) between length L and waist radius w is given by $L=L_{opt}$, where $L_{opt}$=5.68 $\pi w^2 n_\omega/\lambda$, and $\lambda$ is the free space pump wavelength. Since SHG efficiency does not have a sensitive dependence on L for L near $L_{opt}$, a nonlinear medium length L in the range of about $L_{opt}/3 < L < 3\ L_{opt}$ provides performance that is nearly optimal. The optimal location of the beam waist within the nonlinear medium is at the center of the nonlinear medium (i.e., separated from the entrance and exit faces by a distance L/2).

Other methods of increasing SHG efficiency are frequently employed in addition to phase-matching and optimal focusing. Multipass SHG is one such method, where the pump and second harmonic beams make multiple passes through the nonlinear medium. In multipass SHG, it is necessary to ensure that the pump and second harmonic beams have the proper relative phase in the second and successive passes, so that the contribution of each pass to the second harmonic beam is constructive. J. M. Yarborough et al. (Applied Physics Letters 18(3) 1970) demonstrate double pass SHG in birefringently phase-matched lithium niobate, where a mirror is used to retro-reflect the pump and second harmonic beams through the nonlinear medium, and the separation between the mirror and the crystal is varied to control the relative phase of the two beams in the second pass via the dispersion of air. G. Imeshev et al. (Optics Letters 23(3) 165 1998) demonstrate double pass SHG in quasi-phase-matched lithium niobate, where a mirror is used to retro-reflect the pump and second harmonic beams through the nonlinear medium, and the endface of the nonlinear medium facing the mirror is polished at a small non-zero angle relative to the QPM section boundaries. The relative phase of the pump and second harmonic beams in the second pass is adjusted by translating the nonlinear medium with respect to the beams to vary the medium thickness seen by the beams.

Translating a mirror to control the relative phase of the pump and second harmonic beams on the second pass has the disadvantage that a significant range of motion is required (e.g., on the order of several cm). Translating a wedged nonlinear optical medium to control the relative phase of the pump and second harmonic beams on the second pass is undesirable, because temperature control of the nonlinear medium is typically required, which complicates the design, and the size of the nonlinear medium must be increased to accommodate the translation. Retro-reflection of the pump beam does not preserve optimal focusing of the pump beam from the first pass to the second pass. In other words, if the pump beam is optimally focused for a first pass through a nonlinear medium, and a second pass is obtained by retro-reflection, the second pass pump beam will not be optimally focused through the nonlinear medium.

An object of the invention is to provide improved apparatus and method for adjusting the relative phase of the pump beam and second harmonic beam in multipass SHG. Another object of the invention is to provide apparatus and method for ensuring that the pump beam and second harmonic beam are parallel to each other within the nonlinear medium for all passes. Yet another object of the invention is to preserve optimal focusing of the pump beam for all passes. A further object of the invention is to provide apparatus and method for ensuring that the pump beam and second harmonic beam are parallel to each other within the nonlinear medium for all passes, while also ensuring collinearity of corresponding passes of the pump beam and second harmonic beam (i.e., making the second pass pump beam collinear with the second pass second harmonic beam and making the third pass pump beam collinear with the third pass second harmonic beam etc.).

SUMMARY OF THE INVENTION

According to an embodiment of the invention, improved multipass second harmonic generation (SHG) is provided by the use of an inverting, self-imaging telescope. This embodiment ensures parallelism of all passes of all beams within the nonlinear medium. According to another embodiment of the invention, improved multipass SHG is provided by the use of a wedged phasor. This arrangement provides a simple adjustment of the relative phase of the pump beam and second harmonic beam between passes. According to a further embodiment of the invention, improved multipass SHG is provided by the use of an inverting self-imaging telescope in combination with a wedged phasor. This arrangement provides a simple adjustment of the relative phase of the pump beam and second harmonic beam between passes, and ensures parallelism of all passes of all beams within the nonlinear medium. This arrangement also allows corresponding passes of the pump beam and second harmonic beam to be made collinear within the nonlinear medium by design.

DETAILED DESCRIPTION OF THE DRAWINGS

Figure 1:
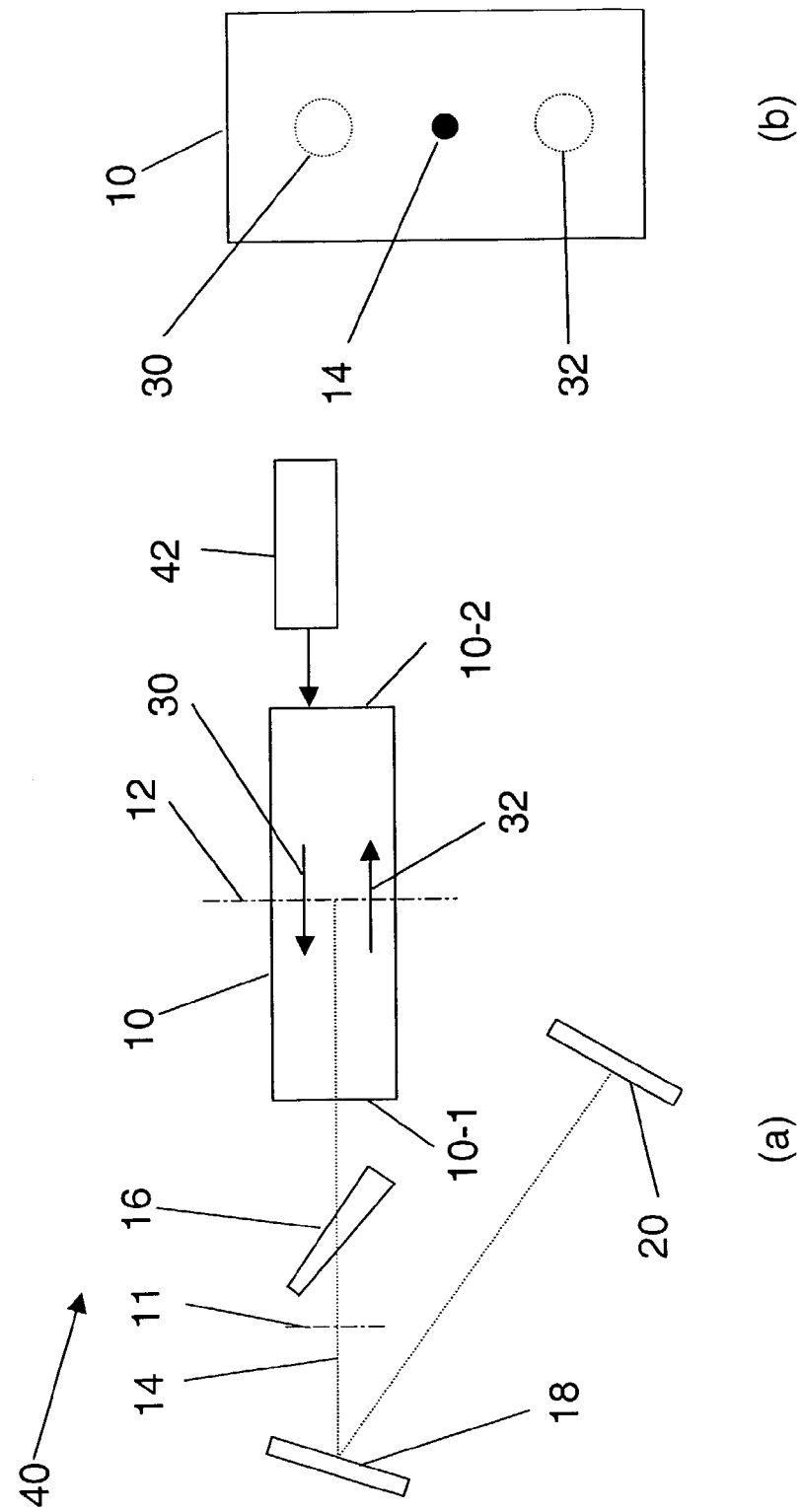
FIG. 1a is a schematic top view of a double pass embodiment of the invention.
FIG. 1b is a schematic end view of a nonlinear medium in a double pass embodiment of the invention.

FIG. 1a is a schematic top view of a double pass frequency doubling apparatus 40, in accordance with the present invention, while FIG. 1b is a schematic end view of a nonlinear medium 10 within apparatus 40. To appreciate the operation of apparatus 40, it is helpful to consider the beam paths through apparatus 40 before discussing the design of apparatus 40 in detail. A pump beam provided by a pump source 42 is received by a face 10-2 of nonlinear medium 10, and is transmitted along a beam path 30 through nonlinear medium 10. A second harmonic beam, with frequency twice the pump frequency, is generated within nonlinear medium 10, and is also transmitted along beam path 30 through nonlinear medium 10. The pump and second harmonic beams are emitted from a face 10-1 of nonlinear medium 10, and are received by a phasor 16. The beams are transmitted through phasor 16 and are received by a mirror 18. The pump and second harmonic beams are then reflected by mirror 18 and are received by a mirror 20. Both beams are reflected by mirror 20, reflected again from mirror 18, transmitted again through phasor 16, and received by face 10-1 of nonlinear medium 10. The second pass pump and second harmonic beams are transmitted along a beam path 32 through nonlinear medium 10, and are emitted from face 10-2 of nonlinear medium 10.

Beam paths 30 and 32 through nonlinear medium 10 are preferably parallel to and spaced apart from each other, as indicated on FIG. 1b. This is accomplished by choosing mirrors 18 and 20 such that they act as an inverting telescope to re-image a reference plane 12 located at the center of nonlinear medium 10 onto itself with negative unity magnification. Axis 14 is the axis of the telescope formed by mirrors 18 and 20, and is substantially centered within nonlinear medium 10 as indicated in FIGS. 1a and 1b. Thus, beam path 32 is the image of beam path 30 formed by the inverting telescope, and separation of beam paths 30 and 32 is obtained by offsetting beam path 30 from axis 14 as indicated in FIG. 1b. This separation of the second pass (beam path 32) from the first pass (beam path 30) is advantageous, since no additional optical elements are required to separate the second pass beams from the first pass beams.

Nonlinear medium 10 can be any material which lacks inversion symmetry. Preferably, nonlinear medium 10 is phase-matched to increase SHG efficiency. Periodically-poled KTP (KTiOPO$_4$) is one suitable nonlinear medium 10, but other nonlinear materials, such as lithium niobate, lithium tantalate, or beta-barium borate, can also be used to practice the invention, using phase-matching techniques, including but not limited to, birefringent phase-matching and quasi-phase-matching. In some cases, it is important to avoid reflection of the pump beam back into the pump source; and in these cases, nonlinear medium 10 (or face 10-2 of nonlinear medium 10) can be slightly tilted (on the order of 0.5 degree to 1 degree) so that the pump beam is not exactly normally incident on face 10-2 of nonlinear medium 10. This ensures that the pump beam reflected from face 10-2 of nonlinear medium 10 does not couple back into the pump source. Preferably, faces 10-1 and 10-2 of nonlinear medium 10 are anti-reflection coated to provide a low reflectivity (i.e. reflectivity <1 percent, more preferably <0.5 percent) at both the pump frequency (or wavelength) and second harmonic frequency (or wavelength) to reduce loss in apparatus 40.

The purpose of phasor 16 is to adjust the relative phase of the pump and second harmonic beams as the beams enter nonlinear medium 10 for a second or subsequent pass (i.e., beam path 32) so that the second pass contributes constructively to the second harmonic beam already present from the first pass. Phasor 16 is fabricated as a wedged plate of a dispersive optical material, i.e., a material which has a different index of refraction at the pump frequency and second harmonic frequency, where the wedge angle between the phasor surfaces is roughly on the order of 0.1 degree to 1 degree. Because phasor 16 is a wedged plate, the amount of dispersive material it introduces into the beam path is variable by translating the phasor perpendicular to the beams. For example, consider doubling of 976 nm radiation to 488 nm. A suitable material for phasor 16 is the commercial glass BK7, which has $n_\omega$=1.508 and $n_{2\omega}$=1.522 at these wavelengths, respectively. The coherence length of BK7 in this example is $L_c$=17.4 $\mu$m. Since the beam makes a double pass through phasor 16, a full $2\pi$ adjustment of the relative phases of pump and second harmonic beams is obtained by varying the phasor thickness seen by the beams by $L_c$=17.4 $\mu$m. Phasor 16 is preferably inserted into assembly 40 so that both pump and second harmonic beams are incident on phasor 16 at or near Brewster's angle and have p polarization (i.e., electric field vector lying in the plane of incidence of a phasor surface), to reduce reflection losses from the surfaces of phasor 16. Alternatively, phasor 16 may have an antireflection coating on its optical surfaces so that the phasor can be used at angles other than Brewster's angle without introducing substantial reflection losses.

Mirror 18 is a concave mirror with a radius of curvature R. Mirror 20 is a flat mirror which is separated from mirror 18 by a length L which is substantially equal to the focal length f=R/2 of mirror 18. Mirrors 18 and 20 are highly reflective (with reflectivity preferably greater than 99.5 percent) at both the pump and second harmonic frequencies. Mirrors 18 and 20 together form a telescope subassembly having an ABCD matrix (for both the pump and second harmonic beams) with A =−1, C=0 and D=−1, with respect to an input and output reference plane 11 located between mirror 18 and phasor 16. The ABCD matrix describes the geometrical imaging properties of an optical system as follows:

$$\begin{pmatrix} y \\ y' \end{pmatrix} = \begin{pmatrix} A & B \\ C & D \end{pmatrix} \begin{pmatrix} x \\ x' \end{pmatrix} \quad (1)$$

where x and x' are the position and slope, respectively, of an input ray relative to the optical axis of the system (i.e., axis 14 on FIG. 1a) at the input reference plane of the optical system, and y and y' are the position and slope, respectively, of the corresponding output ray at the output reference plane of the optical system. For optical systems which retro-reflect a beam, it is frequently convenient to select the same plane (e.g., reference plane 11) as the input reference plane and as the output reference plane.

Mirror 18 is preferably positioned such that the diffractive distance between reference plane 12 at the center of nonlinear medium 10 and mirror 18 is substantially equal to the focal length of mirror 18. The diffractive distance between two points separated by regions of length $L_i$ and index $n_i$ is $\Sigma L_i/n_i$. With this relative positioning of mirror 18 and nonlinear medium 10, reference plane 12 is re-imaged onto itself (with −1 magnification, i.e., inversion) by the telescope subassembly. This ensures that optimal focusing is preserved from one pass to the next. That is, if the first pass pump beam is optimally focused through nonlinear medium 10, (i.e., it has a beam waist of the appropriate size at reference plane 12 at the center of nonlinear medium 10), the second pass pump beam will also be optimally focused through nonlinear medium 10.

Although the primary purpose of the telescope subassembly is to couple the pump and second harmonic beams emitted from nonlinear medium 10 after the first pass back into nonlinear medium 10 for a second pass, the above properties of the ABCD matrix of the telescope subassembly have additional advantageous consequences.

The condition C=0 ensures that the output ray slope depends only on the input ray slope (i.e., it does not depend on input ray position). Therefore, two rays which are parallel at the input of an optical system with C=0 will be parallel at the output of that system. Optical systems with C=0 are telescopes. For multipass SHG, the preservation of parallelism provided by a telescope is especially valuable, because the parallelism of the pump beam with the second harmonic beam on the first pass is preserved in the second pass, which significantly simplifies alignment. In apparatus 40, if C=0 at reference plane 11, C is also 0 at reference plane 12, since there are no focusing elements between reference plane 11 and reference plane 12. Thus, if the first pass pump and second harmonic beams are parallel within nonlinear medium 10, then the second pass pump and second harmonic beams will also be parallel within nonlinear medium 10.

The condition D=−1 ensures that the first pass and second pass ray slopes of the pump beam (and the first pass and second pass ray slopes of the second harmonic beam) are identical between phasor 16 and mirror 18. The sign change of the ray slope from D =−1 is cancelled out by the sign change due to the reversal of the optical axis. This equality of ray slopes also extends into nonlinear medium 10, since there are no focusing elements between mirror 18 and nonlinear medium 10, so the second pass pump beam is parallel to the first pass pump beam within nonlinear medium 10, and the second pass second harmonic beam is parallel to the first pass second harmonic beam within nonlinear medium 10. Parallelism between first and second passes is advantageous because phase-matching typically has a narrow angular acceptance. If the first and second passes go through nonlinear medium 10 at significantly different angles, it may be impossible to efficiently phase-match both passes simultaneously.

The preservation of beam parallelism between first and second passes, as well as between the pump and second harmonic beams, also ensures that the linearly varying thickness of phasor 16 across the beams is cancelled in a double pass through phasor 16. In other words, the relative phase shift imparted to the second harmonic beam relative to the pump beam by a double pass through phasor 16 does not vary from point to point within the beams. Similarly, if nonlinear medium 10 has a linearly varying thickness from point to point within the beams (e.g. if face 10-1 is tilted with respect to the beams and face 10-2 is not tilted), the effect due to this variable thickness is cancelled in a double pass.

The arrangement of mirror 18 and mirror 20 shown in FIG. 1a is a preferred telescope subassembly, since mirror 18 has the same focal length at both the pump and second harmonic frequencies. Other telescope subassemblies with A =−1, C=0 and D= −1 (at both pump and second harmonic wavelengths) are also suitable for practicing the invention. In all cases it is preferred to position the telescope subassembly relative to nonlinear medium 10 such that reference plane 12 at the center of nonlinear medium 10 is substantially re-imaged onto itself with −1 magnification, in order to preserve optimal focusing from one pass to the next.

Although the telescope subassembly with A=−1, C=0 and D=−1 ensures beam parallelism within nonlinear medium 10, beam collinearity within nonlinear medium 10 is not ensured by the telescope subassembly. In other words, it is possible for the second pass second harmonic beam axis to be laterally separated from the second pass pump beam axis, even though the pump and second harmonic beam axes are collinear on the first pass. Two sources of this undesirable beam offset are the dispersion of phasor 16 and the dispersion of nonlinear medium 10 (if the beams intersect face 10-1 of nonlinear medium 10 at a non-normal angle of incidence). The beam offset is affected by the wedge angle of phasor 16, the nominal thickness of phasor 16, the length of nonlinear medium 10 (assuming the design is constrained to re-image reference plane 12 onto itself with −1 magnification), the angle of incidence on face 10-1 of nonlinear medium 10, and the distance between phasor 16 and nonlinear medium 10. Since varying these parameters changes the beam offset without affecting the parallelism preserving property of the telescope subassembly, the beam offset can be eliminated by design.

An additional consideration in a detailed design is astigmatism compensation, because phasor 16 and mirror 18 both cause astigmatism. The relevant parameters are the thickness, incidence angle and wedge angle of phasor 16, and the focal length and incidence angle of mirror 18. Again, these parameters offer enough flexibility to eliminate the net astigmatism of apparatus 40 by design (i.e., by ensuring that the astigmatism of phasor 16 compensates for the astigmatism of mirror 18, and conversely). In addition, there are enough parameters to eliminate astigmatism and to preserve collinearity simultaneously. It is desirable to ensure that apparatus 40 has no net astigmatism, to maximize conversion efficiency and to provide a non-astigmatic second harmonic beam after the second pass. It is also possible to eliminate astigmatism from apparatus 40 by adding one or more optical elements to apparatus 40 in accordance with known principles of telescope astigmatism compensation.

Figure 2:
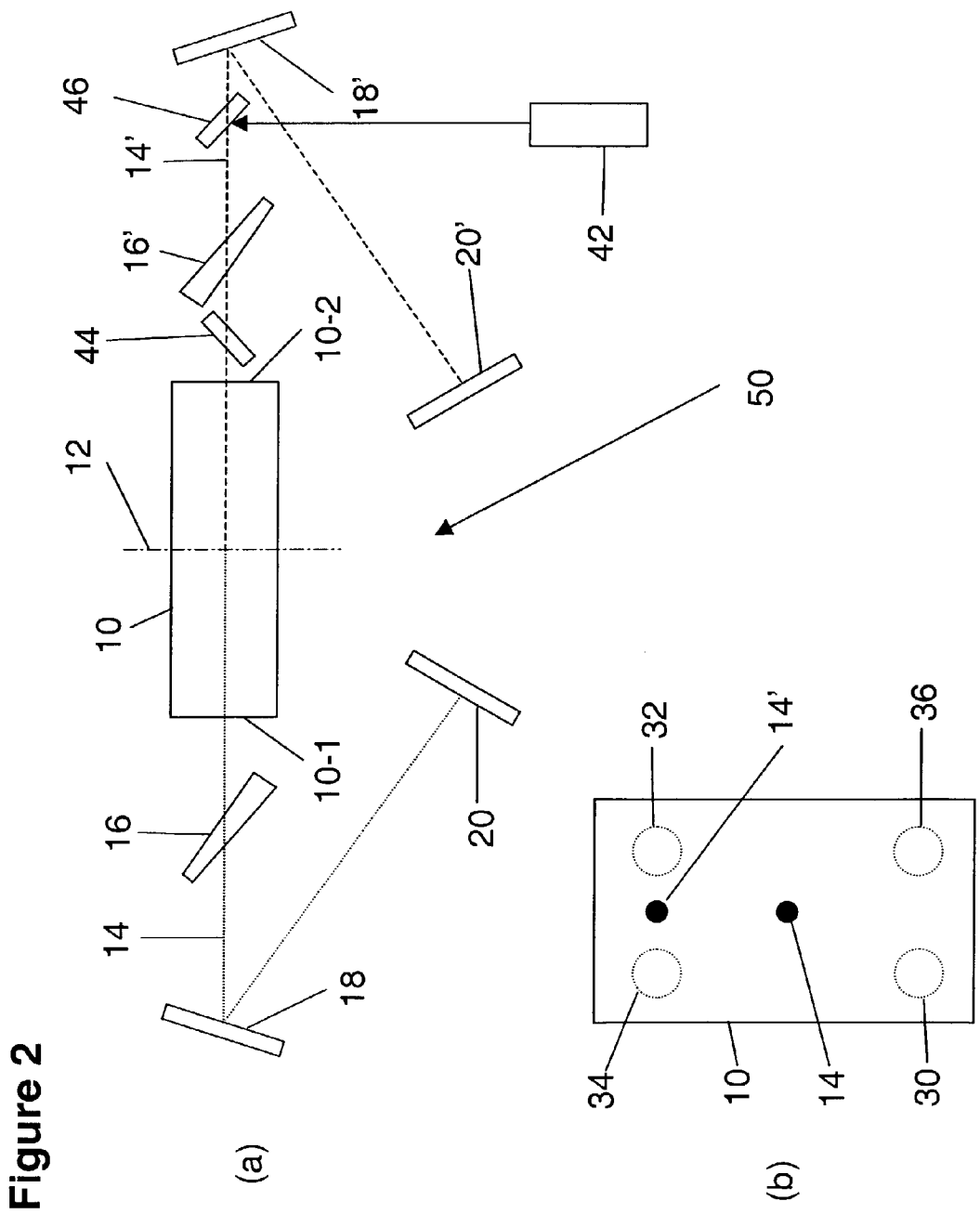
FIG. 2a is a schematic top view of a quadruple pass embodiment of the invention.
FIG. 2b is a schematic end view of a nonlinear medium in a quadruple pass embodiment of the invention.

FIG. 2a is a schematic top view of a four pass frequency doubling apparatus 50, in accordance with the present invention, while FIG. 2b is a schematic end view of nonlinear medium 10 within apparatus 50. To appreciate the operation of apparatus 50, it is helpful to consider the beam paths through apparatus 50 before discussing the design of apparatus 50 in detail. A pump beam is received by face 10-2 of nonlinear medium 10, and is transmitted along beam path 30 through nonlinear medium 10. A second harmonic beam, with frequency twice the pump frequency, is generated within nonlinear medium 10, and is also transmitted along beam path 30 through nonlinear medium 10. The pump and second harmonic beams are emitted from face 10-1 of nonlinear medium 10, and are received by phasor 16. The beams are transmitted through phasor 16 and are received by mirror 18. The pump and second harmonic beams are reflected by mirror 18 and are received by mirror 20. Both beams are reflected by mirror 20, reflected again from mirror 18, transmitted again through phasor 16, and received by face 10-1 of nonlinear medium 10. The pump and second harmonic beams are transmitted in a second pass along beam path 32 through nonlinear medium 10, and are emitted from face 10-2 of nonlinear medium 10.

These two emitted beams are received by a phasor 16', transmitted through phasor 16', received by a mirror 18', reflected from mirror 18' and received by a mirror 20'. After reflection from mirror 20', the pump and second harmonic beams are reflected again from mirror 18', transmitted again through phasor 16', and received by face 10-2 of nonlinear medium 10. The pump and second harmonic beam are transmitted in a third pass along beam path 34 through nonlinear medium 10, and are emitted from face 10-1 of nonlinear medium 10.

These two emitted beams are received by phasor 16, transmitted through phasor 16, received by mirror 18, reflected from mirror 18, and received by mirror 20. After reflection from mirror 20, the pump and second harmonic beams are reflected again from mirror 18, transmitted again through phasor 16, and received by face 10-1 of nonlinear medium 10. The pump and second harmonic beams are transmitted in a fourth pass along beam path 36 through nonlinear medium 10, and are emitted from face 10-2 of nonlinear medium 10.

Beam paths 30, 32, 34 and 36 through nonlinear medium 10 are separated from each other, as indicated on FIG. 2b. This is accomplished by choosing mirrors 18 and 20 such that they act as a first inverting telescope to re-image reference plane 12 located at the center of nonlinear medium 10 onto itself with negative unity magnification. Axis 14, which is the axis of the telescope formed by mirrors 18 and 20, is substantially centered within nonlinear medium 10 as indicated on FIG. 2b. Thus, beam path 32 is the image of beam path 30 formed by the inverting telescope, and separation of beam paths 30 and 32 is obtained by offsetting beam path 30 from axis 14 as indicated on FIG. 2b. Mirrors 18' and 20' are also selected such that they act as an inverting telescope to re-image reference plane 12 onto itself with negative unity magnification. Axis 14' is the axis of the telescope formed by mirrors 18' and 20', and is offset from axis 14 as indicated on FIG. 2b. Thus, third pass beam path 34 is the image of second pass beam path 32 formed by this second inverting telescope. Similarly, fourth pass beam path 36 is the image of third pass beam path 34 formed by the first inverting telescope with axis 14. Therefore, all four passes follow distinct paths through nonlinear medium 10, where second pass beam path 32 is the inversion of first pass beam path 30 about axis 14, third pass beam path 34 is the inversion of second pass beam path 32 about axis 14', and fourth pass beam path 36 is the inversion of third pass beam path 34 about axis 14.

Since the four passes in apparatus 50 do not overlap, no beam splitters (which introduce undesirable loss) are required to couple the pump beam into apparatus 50, or to couple the second harmonic beam out of apparatus 50. A preferred method for coupling the pump beam into apparatus 50 is to position a pump turning mirror 46 within apparatus 50 so that a pump beam provided by pump source 42 is reflected to follow beam path 30 through nonlinear medium 10, and such that pump turning mirror 46 does not block the second pass beams following beam path 32 through nonlinear medium 10 or the third pass beams following beam path 34 through nonlinear medium 10.

A preferred method for coupling the second harmonic beam out of apparatus 50 is to position a second harmonic turning mirror 44 within apparatus 50 so that the fourth pass second harmonic beam following beam path 36 through nonlinear medium 10 is reflected out of apparatus 50, and such that second harmonic turning mirror 44 does not block the first pass pump beam following beam path 30 through nonlinear medium 10, the second pass beams following beam path 32 through nonlinear medium 10, or the third pass beams following beam path 34 through nonlinear medium 10.

Phasor 16' has the same characteristics as phasor 16 in FIG. 1a. The first and second telescopes in apparatus 50 (formed by mirrors 18 and 20, and by mirrors 18' and 20', respectively) are both designed as indicated in the discussion of FIG. 1a, i.e., with A=D=−1 and C=0 at the relevant phasor (i.e., phasor 16 for the telescope formed by mirrors 18 and 20, and phasor 16' for the telescope formed by mirrors 18' and 20'), and designed to re-image reference plane 12 onto itself with −1 magnification. This arrangement provides the advantages of beam parallelism on all four passes, and beam collinearity and astigmatism compensation by design, also as indicated above. In addition, phasor 16 applies the same relative phase shift between the first and second passes of the beams as it does between the third and fourth passes of the beams. Because the beam pattern for the four passes is highly symmetrical, the required phase shift between the first and second passes and between the third and fourth passes is the same. Therefore, phasor 16 can simultaneously provide the required phase shift between the first and second passes, as well as between the third and fourth passes, which is highly desirable compared to an alternative where three independent phasors are used in four pass SHG. Even if a linearly varying phase shift is imposed on the beams by nonlinear medium 10 (e.g. if face 10-1 is not exactly perpendicular to the beam axes), this variation is cancelled in double pass, and phasor 16 will still simultaneously provide the required phase shift between the first and second passes, as well as between the third and fourth passes.

Implicit in the above discussion is an assumption that the pump beam and second harmonic beam are collinear within nonlinear medium 10 on the first pass. This assumption is frequently applicable (e.g. for collinear QPM or collinear BPM with negligible beam walkoff). In some cases, such as birefringent phase-matching with nonzero beam walkoff, the pump and second harmonic beams are not collinear over the entire length of nonlinear medium 10. In other cases, such as non-collinear phase-matching, the pump and second harmonic beams are not parallel within nonlinear medium 10. For these cases, the apparatus and methods discussed above are also advantageous, since compensation methods analogous to the lateral offset compensation discussed above can be applied to ensure that the second pass "undoes" the divergence of the pump beam from the second harmonic beam caused by the first pass. Similarly, the fourth pass can "undo" the relative divergence of the two beams caused by the third pass, etc.

The advantageous beam parallelism provided by an inverting telescope can be obtained in embodiments of the invention which do not include a wedged phasor. The advantageous phase adjustment provided by a wedged phasor can be obtained in embodiments of the invention which do not include an inverting telescope. Embodiments of the invention can have any number of passes greater than or equal to two.

What is claimed is:

1. Apparatus for frequency-doubling optical radiation, the apparatus comprising:
   a) an optically nonlinear medium that receives a first beam of optical radiation having a first frequency, wherein the first beam makes N passes through the nonlinear medium, where N is an integer $\geq 2$, to thereby generate a second beam having a second frequency substantially equal to twice the first frequency; and b) a telescope subassembly having an ABCD matrix with matrix coefficients substantially A=−1, B has any real value, substantially C=0 and substantially D=−1, for receiving and coupling the first and second beams, emitted from the nonlinear medium after a pass number J, back into the nonlinear medium for a pass number J+1, where $1 \leq J < N$, wherein the second beam issues from the telescope subassembly.

2. Apparatus for frequency-doubling optical radiation, the apparatus comprising:

a) an optically nonlinear medium that receives a first beam of optical radiation having a first frequency, wherein the first beam makes N passes through the nonlinear medium between a first face and a second face of the medium, where N is an integer $\geq 2$, to thereby generate a second beam having a second frequency substantially equal to twice the first frequency;

b) a first telescope subassembly having a first ABCD matrix with matrix coefficients substantially A =−1, B has any real value, substantially C= 0 and substantially D=−1, for receiving and coupling the first and second beams, emitted from the nonlinear medium after a pass number J, back into the nonlinear medium for a pass number J+1, where $1 \geq J < N$; and c) a wedged phasor for receiving, and adjusting a relative phase of, the first and second beams before a pass number K of the beams though the nonlinear medium, where $2 \leq K \leq N$, where the phasor is positioned between the nonlinear medium and the telescope subassembly.

3. The apparatus of claim 2, wherein a reference plane within said nonlinear medium is substantially re-imaged onto itself with negative unity magnification by said telescope subassembly, and wherein the reference plane is substantially perpendicular to a direction of propagation of said first and second beams.

4. The apparatus of claim 3, wherein said first beam is substantially a Gaussian beam having a beam waist with a 1/e amplitude radius w that is related to a distance L between said first and second faces according to $L_{opt}/3 < L < 3\ L_{opt}$, where $L_{opt} = 5.68 \pi w^2 n_\omega / \lambda$, $n_\omega$ is an index of refraction of said nonlinear medium at said first frequency, and $\lambda$ is a free space wavelength of said first beam, and wherein the beam waist is substantially located on said reference plane and said reference plane is substantially centered between said first and second faces.

5. The apparatus of claim 4, wherein said distance L is substantially equal to $L_{opt}$.

6. The apparatus of claim 2, wherein said nonlinear medium is birefringently phase-matched.

7. The apparatus of claim 2, wherein said nonlinear medium is quasi-phase-matched.

8. The apparatus of claim 7, wherein said nonlinear medium comprises periodically-poled $KTiOPO_4$.

9. The apparatus of claim 2, wherein said first and second beams pass through said wedged phasor at an angle substantially equal to Brewster's angle and wherein said beams are incident on a face of said wedged phasor with substantially p polarization.

10. The apparatus of claim 2, wherein said nonlinear medium is substantially a parallelepiped having a center line intersecting centers of said first and second medium faces, the apparatus further comprising a second telescope subassembly having a second ABCD matrix with matrix coefficients substantially A =−1, B has any real value, substantially C=0 and substantially D=−1, wherein said first telescope subassembly has a first axis which is substantially collinear with the center line, wherein the second telescope subassembly has a second axis which is parallel to and spaced apart from the center line, and wherein a plane containing the first axis and the second axis is substantially parallel to a face of the parallelepiped.

11. The apparatus of claim 2, further comprising means for astigmatism compensation for at least one of said first telescope subassembly and said phasor.

12. The apparatus of claim 2, further comprising means for ensuring collinearity of said second beam with said first beam for at least one of said passes through said nonlinear medium.

13. A method for frequency-doubling optical radiation, the method comprising:

a) transmitting a first beam of optical radiation having a first frequency through an optically nonlinear medium so that the first beam makes N passes through the nonlinear medium, where N is an integer $\geq 2$, to thereby generate a second beam having a second frequency substantially equal to twice the first frequency; and b) passing the first and second beams, emitted from the medium after a pass number J, through a telescope subassembly having an ABCD matrix with matrix coefficients substantially A =−1, B has any real value, substantially C 0 and substantially D=−1, whereby the first and second beams are received and coupled back into the nonlinear medium for a pass number J+1, where $1 \leq J < N$, where the second beam issues from the nonlinear medium after pass number J+1.

14. A method for frequency-doubling optical radiation, the method comprising:

a) transmitting a first beam of optical radiation having a first frequency through an optically nonlinear medium so that the first beam makes N passes through the nonlinear medium between a first face and a second face of the medium, where N is an integer $\geq 2$, to thereby generate a second beam having a second frequency substantially equal to twice the first frequency;

b) passing the first and second beams, emitted from the medium after a pass number J, through a first telescope subassembly having a first ABCD matrix with matrix coefficients substantially A =−1, B has any real value, substantially C=0 and substantially D=−1, whereby the first and second beams are coupled back into the medium for a pass number J+1, where $1 \leq J < N$; and c) passing the first and second beams through a wedged phasor for adjusting a relative phase of the first and second beams before a pass number K of the beams through the nonlinear medium, where $2 \leq K \leq N$, where the phasor is positioned between the nonlinear medium and the telescope subassembly, where the second beam issues from the nonlinear medium after pass number J+1.

15. The method of claim 14, wherein a reference plane within the nonlinear medium is substantially re-imaged onto itself with negative unity magnification by said telescope subassembly, and wherein the reference plane is substantially perpendicular to a direction of propagation of said first and second beams.

16. The method of claim 15, wherein said first beam is substantially a Gaussian beam having a beam waist with a 1/e amplitude radius w that is related to a distance L between said first and second faces according to $L_{opt}/3 < L < 3\ L_{opt}$ where $L_{opt}=5.68\pi w^2 n_\omega/\lambda$, $n_\omega$ is an index of refraction of said nonlinear medium at said first frequency, and $\lambda$ is a free space wavelength of said first beam, and wherein the beam waist is substantially located on said reference plane.

17. The method of claim 16, wherein said distance L is substantially equal to $L_{opt}$.

18. The method of claim 14, wherein said nonlinear medium is birefringently phase-matched.

19. The method of claim 14, wherein said nonlinear medium is quasi-phase-matched.

20. The method of claim 19, wherein said nonlinear medium comprises periodically-poled $KTiOPO_4$.

21. The method of claim 14, wherein said first and second beams pass through said wedged phasor at an angle substantially equal to Brewster's angle and wherein said beams are incident on a face of said wedged phasor with substantially p polarization.

22. The method of claim 14, wherein said nonlinear medium is substantially a parallelepiped having a center line intersecting centers of said first and second medium faces, the method further comprising passing said first and second beams through a second telescope subassembly having a second ABCD matrix with matrix coefficients substantially A = −1, B has any real value, substantially C=0 and substantially D=−1, wherein said first telescope subassembly has a first axis which is substantially collinear with the center line, wherein the second telescope subassembly has a second axis which is parallel to and spaced apart from the center line, and wherein a plane containing the first axis and the second axis is substantially parallel to a face of the parallelepiped.

23. The method of claim 14, further comprising compensating for the astigmatism of at least one of said telescope subassembly and said phasor.

24. The method of claim 14, further comprising ensuring collinearity of said second beam with said first beam for at least one of said passes through said nonlinear medium.

* * * * *